US012766868B2

(12) United States Patent
Clement

(10) Patent No.: US 12,766,868 B2
(45) Date of Patent: Oct. 20, 2026

(54) DECORATIVE PAPER LAYERS, PRINTABLE PAPER LAYERS. METHODS FOR MANUFACTURING PRINTABLE SUBSTRATES, AND INK USED IN SUCH METHOD

(71) Applicant: Unilin, BV, Wielsbeke (BE)

(72) Inventor: Benjamin Clement, Waregem (BE)

(73) Assignee: Unilin, BV, Wielsbeke (BE)

(*) Notice: Subject to any disclaimer, the term of this patent is extended or adjusted under 35 U.S.C. 154(b) by 93 days.

(21) Appl. No.: 17/428,803

(22) PCT Filed: Feb. 26, 2020

(86) PCT No.: PCT/IB2020/051624
§ 371 (c)(1),
(2) Date: Aug. 5, 2021

(87) PCT Pub. No.: WO2020/178666
PCT Pub. Date: Sep. 10, 2020

(65) Prior Publication Data

US 2022/0126620 A1 Apr. 28, 2022

Related U.S. Application Data

(60) Provisional application No. 62/840,496, filed on Apr. 30, 2019.

(30) Foreign Application Priority Data

Mar. 6, 2019 (EP) .................................... 19161006

(51) Int. Cl.
*B41M 5/52* (2006.01)
*B41M 5/00* (2006.01)
*B41M 5/50* (2006.01)
*B44C 5/04* (2006.01)
*C09D 11/36* (2014.01)

(52) U.S. Cl.
CPC ........ *B41M 5/5218* (2013.01); *B41M 5/0017* (2013.01); *B41M 5/508* (2013.01); *B44C 5/04* (2013.01); *C09D 11/36* (2013.01)

(58) Field of Classification Search
CPC ...... B41M 5/0017; B41M 5/04; B41M 5/508; B41M 5/5218; C09D 11/36
See application file for complete search history.

(56) References Cited

U.S. PATENT DOCUMENTS 6,372,329 B1 4/2002 Graczyk et al.
6,706,372 B2 3/2004 Schulz et al.
2003/0039810 A1 2/2003 Schulz et al.
2017/0028688 A1* 2/2017 Dannhauser ......... B41M 5/5218

FOREIGN PATENT DOCUMENTS

| | | | | | |
|---|---|---|---|---|---|
| CN | 1270255 | A | | 10/2000 | |
| CN | 101090830 | A | | 12/2007 | |
| CN | 102378693 | A | | 3/2012 | |
| CN | 102427950 | A | | 4/2012 | |
| CN | 105026172 | A | | 11/2015 | |
| CN | 105835589 | A | | 8/2016 | |
| CN | 108349284 | A | | 7/2018 | |
| CN | 108495753 | A | | 9/2018 | |
| EP | 1044822 | B1 | | 10/2000 | |
| EP | 1290290 | B2 | | 3/2003 | |
| EP | 1749676 | B1 | | 2/2007 | |
| EP | 1857511 | B1 | | 11/2007 | |
| EP | 1872959 | B1 | | 1/2008 | |
| EP | 2132041 | B2 | | 12/2009 | |
| EP | 2274485 | B1 | | 1/2011 | |
| EP | 2293946 | B1 | | 3/2011 | |
| EP | 2431190 | B1 | | 3/2012 | |
| EP | 3199360 | A1 | * | 8/2017 | .......... B41J 11/0015 |
| EP | 3415337 | A1 | * | 12/2018 | .............. B41M 5/50 |
| JP | 2007076034 | A | | 3/2007 | |
| JP | 2016159522 | A | * | 9/2016 | |
| WO | 2011124503 | A4 | | 10/2011 | |
| WO | 2014084787 | A1 | | 6/2014 | |
| WO | 2015118451 | A1 | | 8/2015 | |
| WO | 2015140682 | A1 | | 9/2015 | |
| WO | 2017130117 | A1 | | 8/2017 | |
| WO | 2018235301 | A1 | | 12/2018 | |

OTHER PUBLICATIONS

Machine Translation of WO 2013/105912 A2 (Year: 2013).*
Machine Translation of JP-2016159522-A (Year: 2016).*
Dai et al., "Production and Application of Silicon Compound", 1st edition, Chengdu University of Science and Technology Press, May 31, 1994, p. 212-213.

* cited by examiner

*Primary Examiner* — Sathavaram I Reddy
(74) *Attorney, Agent, or Firm* — Capitol City TechLaw

(57) ABSTRACT

A decorative paper layer may include a base paper layer with a core. A pattern may be formed by digitally applying inks to at least one surface of the base paper layer. The inks may penetrate from the surface into the core of the base paper layer over a depth that is less than 30% of a thickness of the base paper layer. Methods are also provided for manufacturing printable papers and decorative paper layers, as well as inks that may be used in such methods.

5 Claims, No Drawings

DECORATIVE PAPER LAYERS, PRINTABLE PAPER LAYERS. METHODS FOR MANUFACTURING PRINTABLE SUBSTRATES, AND INK USED IN SUCH METHOD

This application claims priority under 35 USC § 119(a)-(d) to EP patent application No. 19161006.2, which was filed on Mar. 6, 2019, and under 35 USC 119(e) to U.S. provisional patent application No. 62/840,496, which was filed on Apr. 30, 2019, the entire contents of both of which are incorporated herein by reference.

BACKGROUND

1. Field

The present invention relates to a decorative paper layer for use in a method for manufacturing panels having a decorative surface, or, so-called decorative panels, as well as to an ink used in such method. The invention also relates to a method for manufacturing a paper or another substrate printable with inkjet for use as e.g. a decorative paper in such panels and to the printable paper obtainable with such method. According to a variant the obtained decorative paper may be used in a laminated assembly other than a panel, such as in so-called CPL (compact laminate), which may consist of a laminate of two or more consolidated resin impregnated paper layers.

More particularly, the invention is related to a method for manufacturing laminate panels, wherein said panels at least comprise a substrate material and a provided thereon top layer with a printed decor. The method could be used for manufacturing panels, the top layer of which is formed from thermosetting resin and one or more paper layers, wherein said paper layers comprise a decor paper having a printed pattern.

2. Related Art

Traditionally, the decor or pattern of such panels is printed on paper by means of offset or rotogravure printing. The obtained paper is taken up as a decorative paper in a so called laminate panel. For manufacturing such panels the DPL process can be practiced. According to the DPL process (Direct Pressure Laminate) the already printed paper or decorative paper is provided with a melamine based resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to EP 1 290 290, from which it is further known to provide a relief in said melamine surface during the same press treatment or pressing operation, namely by bringing said melamine surface in contact with a structured press element, for example a structured press plate.

The printing of paper by means of an analog printing process, such as by rotogravure or offset printing, at affordable prices inevitably leads to large minimal order quantities of a particular decorative paper and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns, be it on paper or directly on a plate-shaped substrate possibly with the intermediary of preparatory layers. Such digital techniques can enhance the flexibility in the printing of decors significantly. Reference is amongst others made to the EP 1 872 959, WO 2011/124503, EP 1 857 511, EP 2 431 190, EP 2 293 946, WO 2014/084787, WO 2015/140682 and the WO 2015/118451, where such techniques are disclosed.

EP 2 132 041 discloses a method at least comprising the step of providing a paper layer with thermosetting resin and the step of providing said resin provided paper layer with a printed pattern. Preferably multi color printed patterns are applied for the realization of a decor, e.g. representing a wood pattern, on the abovementioned paper layer. Such decor extends over the majority, or even over the totality of the resin provided paper layer. In EP 2 132 041, a digital printer, more particularly an inkjet printer is applied. It has however been very difficult to reliably further process such printed paper for manufacturing laminate panels, such as in a DPL process, since pressing defects may originate in the resin surface and milling, drilling or sawing through the laminate surface or at the edge thereof often leads to splitting in the top layer. Furthermore, the inks or dyes of the EP'041 may overly wet the paper layer and cause wrinkling effects or bleeding upon further handling of the printed paper, leading to an instable and/or slow production process. To solve this issue the EP'041 proposes to immediately dry the printed paper layer.

EP 1 044 822, EP 1 749 676 and EP 2 274 485 disclose the use of an inkjet receiver coating to enhance the printing quality on an otherwise untreated base paper layer. Such inkjet receiver coating comprises pigments and a polymer such as polyvinyl alcohol. Although enhanced, the obtained color density of the print on such treated paper is still inferior to that of analog prints.

As recognized in WO 2015/118451 the use of paper treated with an inkjet receiver coating may lead to malfunctioning of the printing equipment. Dust may release from the inkjet receiver coating and bring about all sorts of malicious effects to the critical parts of an inkjet printer. The dust may for example clog one or more of the nozzles and lead to printing faults. WO 2015/118451 proposes to avoid too large a bent, i.e. too sharp a bent, in the paper in the printing equipment to minimize the release of dust.

During private research, the inventor has also encountered problems with subsequent impregnation of dust releasing paper layers, even in the cases where the paper layers were already printed upon. The releasing dust may pollute the resin bath, the rollers, cameras and other equipment in, or in the immediate vicinity of, the impregnation channel, leading to defects in the final product or of the equipment used.

SUMMARY

The present invention aims in the first place at an alternative decorative paper layer that may be used in a method for manufacturing panels having a decorative surface, and seeks, in accordance with several of its preferred embodiments, to solve one or more of the problems arising in the state of the art.

DESCRIPTION OF NON-LIMITING EMBODIMENTS

Therefore the present invention, in accordance with its first independent aspect, relates to a decorative paper layer comprising a base paper layer and a pattern formed by digitally applying inks to at least one of the surfaces of the base paper layer, with as a characteristic that said inks penetrate from said surface into the core of said base paper layer over a depth equaling less than 30% of the thickness of the base paper layer, and preferably at least 10% of the thickness of the base paper layer. Preferably the thickness of said base paper layer is between 50 and 200 μm, preferably between 60 and 130 μm. The pattern formed by the digitally applied inks preferably extends over the majority, or even over the totality of the base paper layer. Preferably, on average, an ink load of at least 1 gram per square meter, or at least 2 grams per square meter is present in the printed area of said base paper layer.

It is clear that the longitudinal edges of the base paper layer may be left unprinted, or be printed with a technical image, such as position marks and/or markings to visually check printing quality.

Preferably said decorative layer is in roll form, and has, therefor, a practically endless length, for example at least 1000 meter, and/or the width of said decorative layer is preferably between 1 meter and 4 meter, more preferably between 1.6 and 2.2 meter.

Preferably, said inks are aqueous pigmented inks. Especially in the cases where the inks have been applied by inkjet printing, the water content of the applied inks may be large, as firing microdroplets, such as droplets having a volume of 65 picoliter (pL) or below, requires a low viscosity of the ink. According to a preferred embodiment, the droplets used may be between 1 and 10 pL, for example 3 or 6 picoliter droplets.

Preferably, said base paper layer has a mean air resistance according to the Gurley method (Tappi T460) of 25 seconds or below. The low air resistance makes the base paper layer particularly suitable for impregnation with resin. Preferably a thermosetting resin is used, as may be the case in the aforementioned DPL process. A preferred thermosetting resin is melamine based resin, such as a melamine formaldehyde resin.

Preferably, said base paper layer has a paper surface weight of 60 to 85 grams per square meter, wherein 70 grams or about 70 grams per square meter is a preferred value.

The inventor has found that some penetration of the inks into the depth direction of the base paper layer should be tolerated, but not too much. The tolerable penetration is aimed at attaining a certain bleeding of the inks in the horizontal direction, i.e. in the directions comprised in the surface of the paper. The horizontal bleeding may lead to an eventual recorded dot which is significantly larger than the expected size of the recorded dot based on the volume of the applied droplet of ink, more particularly larger than the expected size based on the dimension of the fired droplet of ink in the case of an inkjet printer. Significant horizontal bleeding, or dot gain, leads to a high color density of the obtained print, and vivid colors can be obtained with less ink applied to the base paper layer. Preferably said inks are applied by firing droplets to said base paper layer at a definition as expressed by a DPI value (Dots Per Inch) and yielding an average distance in between the center of adjacent dots formed by respective ink droplet, whereas the dots formed by said ink droplets are larger than said average distance.

Preferably said depth over which the inks penetrate is less than 30 μm, preferably 20 μm or less.

A limited ink penetration combined with a significant horizontal bleeding, or dot gain, can be reached in accordance with one or a combination of two or more of the below possibilities.

According to a first possibility, silica particles are available on said surface of said base paper layer. Preferably the silica content of said base paper layer is essentially available on said surface. Preferably the silica content of said base paper layer quickly drops underneath said surface. Preferably, the silica content of said base paper layer at a depth of 20%, or even at a depth of 10%, of the thickness of the base paper layer is below 5% of the silica content on said surface, or even below 1%, if not 0%. The silica particles may be present in an ink receiving layer provided at said surface. Preferably, such ink receiving layer further comprises a binder, preferably a hydrophilic binder, such as PVA (polyvinyl alcohol), and/or comprises a metal salt, such as Calcium Chloride or $CaCl_2$. The availability of silica particles immediately on the surface of the base paper layer, possibly in combination with a hydrophilic binder, leads to a quick absorption of the vehicle of the inks, and a limited bleeding in depth direction of color pigments dispersed in said vehicle. The preferable availability of a metal salt at the surface of the base paper layer destabilizes the dispersed pigments and tends to lock the pigments at the surface or the immediate vicinity thereof, while the vehicle is allowed to penetrate further down.

According to a second possibility, silica particles are available in and/or on said base paper layer, said silica particles being particles of precipitated silica, preferably having a particle size as expressed by the d50 particle size as determined by the laser light scattering granulometry technique, of 1 to 40 micrometer, preferably 1 to 15 micrometer, or 2 to 12 micrometer. As opposed to smaller particles, particles in the range of 1 to 40 micrometer are less prone to be absorbed in the base paper layer upon application, thereby being more effective at the surface of the paper layer. The silica particles of the precipitated type are generally larger than e.g. particles of the fumed type, and have a higher surface roughness. Precipitated silica is porous and, in the cases where the printed paper layer is afterwards impregnated with a resin, like melamine resin, the resin may also penetrate the porosities of the precipitated silica. Further precipitated silica comprises more silanol-groups and hydroxy groups than fumed silica. These groups have more affinity, compatibility, with a resin like melamine resin. The inventor has further observed that a coating obtained with precipitated silica has a higher roughness or, in other words a BEKK smoothness value (measured in accordance with ISO 5627:1995) that is significantly lower, than when the same coating is formed with fumed silica. All of the above leads to a better adhesion of any resin or resin layer applied on top of the printed pattern, especially when high ink loads are used to form the pattern or certain areas thereof, such as ink loads of 4 milliliter per square meter or more.

According to a third possibility, said core of said base paper layer is free or essentially free from silica particles. It is preferred that any coating with silica is preferably mainly present at the surface of the base paper layer, namely there where it is most effective in limiting the penetration depth and generating some horizontal bleeding or dot gain. The inventor has observed that certain commercial inkjet printable base paper layers for use in DPL panels have a large content of relatively small, i.e. 200 nanometer or smaller, fumed silica particles that has penetrated in between the cellulose fibers of the base paper layer. These papers lead to penetration of pigmented aqueous inks in depth direction to a much larger extent, and to a subsequent loss of color density. A higher ink loading must be practiced to attain a certain color density, which leads in itself then to problems of adhesions with any resin to be applied in or on top of the printed paper layer. The inventor has observed that horizontal bleeding may be practically non-existent in these commercial papers, especially when being jetted upon with small droplets, like 3 pL droplets.

Preferably, all three of the above possibilities are combined on the surface of the same base paper. Preferably a base paper layer is obtained comprising at one of its major surfaces particles of precipitated silica with a d50 particle size value between 1 and 40 micrometer, whereas the core of said paper layer is free or essentially free from silica particles.

Preferably, the smallest ink drop sizes jettable by the printer show a significant dot gain, e.g. 10% or above.

Preferably the paper is treated such that an ink drop of size 5 pL shows a dot gain of 10% or above.

Preferably, an ink droplet of 3 pL, whether it is the smallest available or not, and which has a theoretical drop diameter of about 18 micrometer, is recorded as a dot having a diameter of at least 20 micrometer. In other words the dot gain of a 3 pL droplet is preferably 10% or above. An ink droplet of 6 pL, which has a theoretical drop diameter of about 22.5 micrometer, is preferably recorded as a dot having a diameter of at least 35 micrometer, or at least 40 micrometer. In other words the dot gain of a 6 pL droplet is preferably 55% or above, or 77% or above. A dot gain of about 100%, meaning a recorded size double or about double the theoretical droplet diameter, is not excluded.

The dot gain is preferably such that the diameter of the recorded dot equals or surpasses the average distance between adjacent dots. Such feature is important independently from the fact whether or not the penetration of the ink is limited to 30% of the thickness of the base paper layer. Therefore, the invention, according to a second independent aspect, also relates to a decorative paper layer whether or not according to the first aspect, said decorative paper layer comprising a base paper layer and a pattern formed by digitally applying inks to at least one of surfaces of the base paper layer, with as a characteristic that said inks are applied by firing droplets to said base paper layer at a definition as expressed by a DPI value (Dots Per Inch) and yielding an average distance in between the center of dots formed by each ink droplet, and that the dots formed by said ink droplets are larger than said average distance and/or that the dots formed by the smallest ink droplets used in said pattern are larger than said average distance. Preferably, the recorded dots of at least said smallest ink droplets, surpass said average distance due to the afore mentioned dot gain, or horizontal bleeding, as described in the first aspect. In other words, while the theoretical diameter of the ink drops may be smaller than said average distance, the dot gain is preferably such that the diameter of the recorded dot is larger than said average distance. As an example, the printed pattern may be provided by firing droplets, wherein the smallest droplets have a 3 pL volume, to said base paper layer at a definition of 1200 DPI, which results in an average distance between the center of dots formed by each droplet of about 21 micrometer. Theoretically, the diameter of the 3 pL drops is about 18 micrometer, thus smaller than the average distance between the center of dots. The dot gain, or horizontal bleeding, is preferably such that the recorded dot has a diameter larger than 21 micrometer.

The features of the invention in accordance with said second aspect increase the color density of patterns, in particular when formed at low ink load (e.g. 2 milliliter per square meter or below) and/or using halftone printing. In such patterns, the risk of attaining a grainy image or visual missing nozzle failures is reduced by means of the invention.

In accordance with an alternative definition of the invention in accordance with its second aspect, the recorded dot diameter of the smallest droplet in the printed pattern is at least equal to the pitch of nozzles in the applied print head, namely at least equal to the distance between adjacent nozzles in the applied print head. Preferably all nozzles of the print head have the same size of nozzle opening. Preferably, said smallest droplet has a theoretical diameter smaller than said pitch, but the recorded diameter of such droplet is equal or larger than said pitch, due to horizontal bleeding or dot gain on the surface of the base paper layer. In cases where the nozzles of the print head are arranged in repeating series of two or more adjacent nozzles having different size of nozzle opening, the sum of the recorded diameters of droplets fired from said series, is preferably larger than the pitch in between two of such series. For example, the nozzles may be alternatingly arranged as large and small. In such case the series contains two nozzles, and the pitch is the distance between two large nozzles or between two small nozzles. Preferably the sum of the recorded diameters of a small and a large nozzle is larger than the distance between two large nozzles, or between two small nozzles.

It is clear that in the above preferably a single droplet is used to record a dot, so-called 1 dpd (drops per dot). In the cases where multiple droplets are used, for example using grayscale or halftone printing, to record a dot, preferably the diameter of the recorded dot is at least the same multiple of said average distance and/or of said nozzle pitch. Preferably maximum 3 drops per dot are used. The drops used to form a single dot may be of different volume, e.g. a combination of drops of 6 pL and drops of 3 pL. Using multiple drops per dot usually leads to less ink consumption, a lowered risk of visual nozzle failures and a more homogeneous and even printed surface.

From the above it is clear that it is preferred that any coating on the surface of the printable paper layer is concentrated on the surface rather than being available within the cellulose content of the paper layer, i.e. inside of the paper layer. Such is particularly cumbersome with base paper layers that are suitable for subsequent impregnation with resin, such as with a thermosetting resin, like a melamine based resin, namely for use in e.g. a DPL process. Such base papers are porous and are in particular characterized by a low mean air resistance as expressed by their Gurley value. With the aim of attaining such a coating in a reliable way, the present invention in accordance with a third independent aspect relates to a method for manufacturing a printable paper layer, wherein the method at least comprises the following steps:

- the step of providing a base paper layer having a Gurley value of 25 seconds or below (as measured according to Tappi T460);
- the step of applying a coating substance to at least one of the surfaces of said base paper layer, said coating substance at least comprising a binding agent and silica pigments;

with as a characteristic that measures are taken to minimize absorption of said coating substance in the core of said base paper layer, said measures being any one or a combination of two or more of the following:

- said step of applying said coating substance is performed with a coating equipment other than a size press. Size presses are known in the manufacturing of paper. In a size press, the paper to be treated is passed, from top to bottom, through the nip of two rollers. At the entry of the nip a reservoir of coating substance is available between the rollers, so-called “flooded nip”. The coating substance is absorbed into the paper while it passes through said reservoir. Due to hydrodynamic pressure and mechanical pressure exerted by the rollers, the substance is pressed into the cellulose core of the paper. Such is to be avoided in accordance with the present third aspect of the invention.
- said step of applying said coating substance is performed without squeezing the coated paper. As is clear from the above squeezing or applying mechanical pressure to the coating substance while being applied to the base paper layer is preferably to be avoided in order to minimize penetration of the coating substance into the cellulose core of the base paper layer.
- said step of applying said coating substance is performed by means of a so-called film press. A film press is an example of a coating equipment that exerts only minimal mechanical pressure to the coating substance while being applied to the base paper layer. In a film press, the paper to be treated is passed, from top to bottom, through the nip of two rollers. One or both rollers, preferably only one, is at its surface provided with the coating substance. The roller then transfers the substance in or near the nip on the paper’s surface. The amount of coating to be applied can be defined by the application of the substance to the roller, which may be metered, for example because the application of the substance to the roller is done by means of a blade, a wirebar or similar. The absence of hydrodynamic pressure and the significantly lower mechanical pressure exerted by the rollers, minimizes the amount of coating substance pressed into the cellulose core of the paper. The application rollers can optionally be covered with rubber, e.g. with a Shore A hardness between 30 and 80, to minimize the squeezing effect. Other coverings for the rollers, preferably having a Shore A hardness from 30 to 80, may also limit the squeezing effect.
- said step of applying said coating substance is performed by means of gravure rollers, spraying, slot coating, curtain coating, anilox coating, pressure chamber coating, screen coating and/or rotational screen coating, such as by means of so-called magnoroll from the company Zimmer Maschinenbau GmbH of Austria. Each of these coating equipments separately or in combination form an alternative to the above mentioned film press.
- said silica pigments are of the precipitated type. As stated before with respect to the first aspect, silica pigments of the precipitated type are generally larger than e.g. silica pigments of the fumed type. Pigments of larger particle size tend to become less impregnated into the cellulose core of the base paper layer.
- said silica pigments have a size of 1 micron or larger, e.g. up to and including 40 micrometer, as defined by the d50 particle size value determined by the laser light scattering granulometry technique. Independently from the silica type, the larger the average size of the particles the less they become impregnated into the cellulose core. For a base paper layer with a Gurley value of 25 seconds or below, a d50 size of 1 micrometer is the minimum.
- said silica pigments have a specific surface area, as defined by the BET area measured in accordance with ISO 9277:2010, between 100 and 750 $m^2$/gram, preferably between 300 and 750 $m^2$/gram. The higher BET area leads to a better incorporation of the pigments into the other components of the coating substance, such as into a binding agent. The better incorporated pigments tend to be kept at the surface of the paper rather than penetrating the cellulose core, and also keep other components of the coating substance at the surface.

As aforementioned, adhesion problems with possible resin or resin layers to be applied on the decorative paper layer may depend on the ink load in each area of the printed pattern, or other features of the pattern to be printed. With the goal of attaining a more flexible way of spending resources and material, the present invention, in accordance with a fourth independent aspect, relates to a method for manufacturing a substrate printable with a pattern, wherein the method at least comprises the following steps:

- the step of providing a base substrate;
- the step of applying a coating substance to at least one of the surfaces of said base paper layer, said coating substance at least comprising a binding agent and silica pigments;

with as a characteristic that said step of applying a coating substance is defined and/or controlled at least in part by means of said pattern.

Preferably, the coating substance applied at a particular area of the surface is defined and/or controlled on the basis of the ink load expected on the particular area in the subsequent digital printing step. Such may be carried out according to several examples, of which here below two are further described, without being limitative.

According to a first example, the coating substance may be varied from one paper section to another subsequent paper section, wherein each paper section will be digitally provided with a different printed pattern. One paper section may for example be printed with a light colored wood pattern, while a subsequent paper section may be printed with a dark wood pattern.

According to a second example, that may or may not be combined with the first example, the coating substance may be varied within one paper section. Some portions of a paper section may for example be printed with a generally light colored wood pattern, while another paper section may be printed with a darker portion of the same wood pattern, for example representing a crack or nut, and the coating substance varied in accordance with these portions.

According to a preferred embodiment of the fourth aspect of the invention, the controlling or definition of the coating substance by means of the pattern to be applied, comprises at least a controlling or definition of the amount of the coating substance applied at the particular area of the paper surface, and thus, hence, preferably a variation of said amount.

According to another preferred embodiment which may or may not be combined with the preceding preferred embodiment, the controlling or definition of the coating substance by means of the pattern to be applied, comprises at least a controlling or definition of the composition of the coating substance applied to a particular area of the paper surface, and thus, hence preferably a variation of said composition. The composition of the coating may be varied by for example changing the mix ratio between pigments, e.g. precipitated silica pigments, and binding agent, e.g. PVA (polyvinyl alcohol), and/or by changing the availability of other components, such as the content of metal salts, and/or by varying the size or type of the pigments, and/or by varying the binding agent, when available.

Preferably said coating substance is controlled such that in the areas of the paper surface where a larger ink load is expected, thus on the darker printed portions, a higher water retention capability is reached, for example by raising the amount of the coating substance, raising the size of the pigments, raising the amount of the pigments, raising the content of the metal salt, when available.

Preferably, a printable paper layer obtained or obtainable through the method of the third and/or fourth aspect of the invention has at said surface where the coating or ink receiving layer is applied a BEKK smoothness of 150 seconds or less, preferably 100 seconds or less, as measured in accordance with ISO 5627:1995. As explained before, such limited smoothness is advantageous for the lamination strength with subsequent resin layers applied on top of the printed pattern.

Preferably, such printable layer further shows the properties of the first and/or the second aspect of the invention and/or the preferred embodiments thereof, without being printed upon.

Preferably, said printable paper layer at least at one of its surfaces comprises a coating including silica particles, while the core of said paper layer comprises silica particles at a lesser amount and/or of a smaller particle size and/or is essentially free from silica particles.

According to a fifth independent aspect, the invention aims at minimizing the risk of occurrence of printing defects. To this aim, the present invention relates to an ink for forming a pattern on a surface of a paper layer by inkjet printing, wherein said ink is water based and/or comprises 1 to 40 wt % of insoluble matter and/or polymer, characterized in that said ink further comprises a water soluble, preferably organic, solvent having a boiling point at atmospheric pressure above 120° C. Such solvent may be chosen from the list consisting of alcohol, polyhydric alcohol, glycol derivatives, amines and polar solvents. The total content of said solvent is preferably from 5 to 70% by weight, or 5 to 50% by weight, preferably 5 to 25% by weight.

It is clear that with “insoluble” is meant “insoluble in the ink vehicle at room temperature and atmospheric pressure”. The ink vehicle is preferably water as is the case with water-based ink.

Preferably said ink comprises 20 to 40 wt % of insoluble matter, e.g. at least pigments, and/or polymer, wherein said ink is preferably water based. It is of course possible that the content of insoluble matter is below 20%, or even below 10%.

With water based inks or inks containing large amounts of dispersed insoluble components or polymer compounds, for example, an ink making use of a pigment or a resin microparticle dispersion, or the like, there occurs a phenomenon in which the solvent, e.g. water, in the ink volatilizes from the nozzles during printing or while waiting to print. This causes lowering of the solvent concentration in the ink around the nozzles, and the ink viscosity increases. In the case where the ink viscosity around the nozzles increases, fluid resistance increases inside the nozzles, so that ejection failure may occur. Ejection failures include a fluctuation in the volume, time of flight or direction of flight of the ejected ink droplets, or include stopping of ejection, e.g. because of a nozzle that becomes clogged. As a result, a shift in the dot position on the printing medium or an error in the dot size, or even absence of dots may be brought about.

As a solution the invention according to its fifth independent aspect proposes to add a water soluble, preferably organic, solvent to the ink, which preferably has a boiling point at atmospheric pressure above 120° C. Specific examples of the water-soluble organic solvents include alcohols (for example, pentanol, hexanol, cyclohexanol, and benzyl alcohol); polyhydric alcohols (for example, ethylene glycol, diethylene glycol, triethylene glycol, polyethylene glycol, propylene glycol, dipropylene glycol, polypropylene glycol, butylene glycol, glycerol, hexanediol, pentanediol, glycerin, hexanetriol, and thiodiglycol); glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, propylene glycol monoethyl ether, ethylene glycol dimethyl ether, diethylene glycol dimethyl ether, triethylene glycol dimethyl ether, propylene glycol dimethyl ether, dipropylene glycol dimethyl ether, tripropylene glycol dimethyl ether, ethylene glycol diacetate, ethylene glycol monomethyl ether acetate, triethylene glycol monomethyl ether, triethylene glycol monoethyl ether, and ethylene glycol monophenyl ether); amines (for example, ethanolamine, diethanolamine, triethanolamine, N-methyldiethanolamine, N-ethyldiethanolamine, morpholine, N-ethylmorpholine, diethylenetriamine, triethylenetetramine, polyethyleneimine, and tetramethylpropylenediamine); and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, triacetin, urea).

The water-soluble organic solvents may be used alone or in a combination of two or more types water-soluble organic solvent which are mixable in water without phase separation.

The total content of the water-soluble organic solvent in the inkjet ink is preferably 5% to 70% by weight, more preferably 5% to 50% by weight, even more preferably 5% by weight to 25% by weight.

It is noted that the printable substrates obtained through the method of the third and/or fourth aspect are preferably used for printing with water-based inks or, possibly with UV curing inks or with latex based inks or with hydro-UV inks. In the first place these substrates are intended to be printed upon using inkjet printing equipment. However, the inventor has also found enhanced printing quality with the use of thus treated papers in analog printing equipment, such as with the use of the thus treated papers in rotogravure printing, for example with 3 or more cylinders.

It is further noted that, when, in connection with any of the mentioned aspects of the invention, silica particles are applied to the surface of the base paper layer, such silica particles may be silane treated. Silane treatment of the pigments, in general, may further enhance, i.e. lower, dust release of the attained inkjet receiver coating and the thus treated paper. The silane treatment may relate to a treatment with a coupling agent such as amino-organo-silanes, hydroxysilanes, dipodal silanes and/or other silanes. Preferably, the coupling agent is chosen such that the risk of yellowing upon aging of the attained inkjet receiver coating is low. Preferably, the coupling agent forms 0.1 to 10% of the total wet weight of the inkjet receiver coating.

Preferably, any coating on the surface of the base paper layer, next to silica particles, preferably also comprises a binder. Preferred binders for the inkjet receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

Any coating on the surface of the base paper layer, next to silica particles and possibly binder, further preferably comprises one or more of the following agents:

- Crosslinking agents: between 0.05 and 5 g/m$^2$, preferably between 0.2 and 2 g/m$^2$, e.g. chosen from the list consisting of aldehydes, polyaldehydes, dialdehydes, alcohols, boronic acid, borax, polyalcohols, carbamates, polycarbamates, carbonic acids, glyoxal based agent, zirconium based agents and polycarbonic acids.
- Particle surface modifying agents or coupling agents: between 0.05 and 5 g/m$^2$, preferably between 0.2 and 2 g/m$^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.
- Additives: wetting agent between 0.005 and 2 g/m$^2$, preferably between 0.05 and 1 g/m$^2$; and/or defoaming agent between 0.005 and 2 g/m$^2$, preferably between 0.05 and 1 g/m$^2$; and/or fungicide between 0.005 and 2 g/m$^2$, preferably between 0.05 and 1 g/m$^2$.

Preferably, the base paper layer onto which the coating is applied has a base weight of 50 to 100 grams per square meter, e.g. between 60 and 80 grams per square meter.

Preferably, in the case of a paper layer, the side of the paper layer unto which the coating or inkjet receiver coating is to be applied has been smoothened (German: geglättet), preferably during its production. The smoothening diminishes the amount of binder penetrating the paper's core, such that the pigments contained therein can be better bound by the available binder substance and variations in absorption may be less. Preferably, the printable paper layers obtained or obtainable through the methods of the invention, i.e. including a possible coating, has a Gurley value of between 30 and 120 seconds, and preferably between 30 and 80 seconds. Such paper layer results in an excellent printing quality, since the deposited inks tend to bleed less into the paper, and the position accordance, or so-called register, between printed patterns applied with different inkjet heads is more easily attained and maintained. Indeed, a relatively high Gurley value leads to more dimensionally stable paper, since it is less prone to water absorptance. When dealing with the impregnation with thermosetting resin of such a high Gurley value paper one could consider tuning down the speed of the impregnation channel, the use of pressurized impregnation techniques and the lowering of the viscosity of the impregnating resin.

The coating available on the paper surface may be applied in a single step, alternatively, and according to the most preferred embodiment said coating is applied in at least two partial steps, wherein respectively a first layer with a first composition and, subsequently, a second layer is applied with a second composition, both compositions at least comprising said binder.

The inventor has witnessed that the application of a coating in two partial steps leads to a better incorporation or binding of the pigment. The risk of dust releasing from the paper is reduced as compared to a situation where the same amount of pigment is applied in only one coating step. According to the inventor this surprising effect is to be attributed to the first layer forming a kind of barrier for the binder of the second layer against penetration in the paper layer. The binder of the second layer is better effective in binding pigments that would otherwise be loose or badly bound on the surface of the paper. The better embedded pigments lead to a significant reduction of dust release from the paper upon further handling, e.g. printing, impregnation with resin, thereof.

The application of the coating in two steps may further lead to a more even application of the entirety of an inkjet receiver coating obtained in such manner Where the first composition may be partly absorbed in the paper layer in a non-uniform manner, and therefor may lead to an uneven first layer having less effective portions, the second composition levels out the possible unevenness at least to some extent.

The application of the inkjet receiver coating in at least two steps allows for creating gradients of certain components of the coating through its thickness, since the first and second composition may have different components or may both have components that are present in a different concentration, as will be explained further. The application of the inkjet receiver coating in at least two steps further allows to create coating layers of different thickness.

The method of the invention and especially those embodiments where the inkjet receiver coating is applied in two partial steps, is especially interesting when it is started from paper layers the mean air resistance of which is low, e.g. with a Gurley value of 30 seconds or below, e.g. 25 seconds or below. In such cases the binder contained in the first layer tends to be largely absorbed in the paper mass, leaving the pigment content largely unbound on the surface. Preferably the paper layer is a standard printing base paper or another untreated paper layer having a mean air resistance as expressed by Gurley value of 30 seconds or lower. It is of course not to be excluded that in the method of the invention, according to an alternative embodiment, it is started from a paper treated with thermosetting resin prior to the application of said inkjet receiving coating. Preferably, in this latter case, the resin provided paper layer has a mean air resistance with a Gurley value of 100 seconds or lower. Also in such case the application of an inkjet receiver coating in two partial steps has significant advantages, e.g. regarding dust release, the minimization of vertical bleeding of jetted inks, the uniform application of the inkjet receiver coating.

In general, the method of the invention, in the cases where the inkjet receiver coating is applied in two partial steps, allows to apply an inkjet receiver coating with a higher pigment content and, therefore, a higher capability, or higher speed, of absorbing the vehicle of the applied inks, e.g. water in the case of aqueous pigmented inks, while maintaining or even reducing dust release from the treated printable surface. The higher capability or speed of absorbing the vehicle may lead to a higher print definition.

Preferably, in the case where the inkjet receiver coating is applied in two partial steps, said first layer and said second layer differ in that they show one or more of the following properties:

1.—the property that said first layer as well as said second layer comprise pigment and binder, albeit in a different pigment to binder ratio;
2.—the property that the dry weight of material applied for said first layer and said second layer is different;
3.—the property that said first layer as well as said second layer comprise pigment and binder, wherein the average particle size of the pigments contained in said first layer is larger than the average particle size contained in said second layer;
4.—the property that said first layer as well as said second layer comprise an ink reactive compound, albeit in a different composition;
5.—the property that said first layer at least comprises pigment and binder, while the second layer is free from pigments, or at least comprises less pigment than said first layer, or comprises less than 10% of the pigment content of said first layer.

Regarding the first mentioned property, preferably said first composition has a pigment to binder ratio which is larger than the pigment to binder ratio of said second composition. In this way the binder of the second layer primarily binds the pigments of the first layer and levels out unevenness in the first layer.

Preferably the pigment to binder ratio in said second composition is lower than 2:1, and preferably lays between 0:1 and 2:1. When the ratio in the second composition is below 1.5:1 an extremely low dust release has been witnessed. As expressed above, it is not excluded that, in some embodiments, said second composition is free from pigments.

Whether or not in combination with the mentioned preferred second composition, the pigment to binder ratio in said first composition may be chosen between 1:1 and 25:1 or between 2:1 and 10:1, and is preferably 3.5:1 or larger than 3.5:1, and even better 5.5:1 or larger than 5.5:1, though preferably smaller than 10:1.

A good combination of the first and second composition is reached when the ratio pigment to binder in the second composition is between 0:1 and 2:1 and the ratio pigment to binder in the first composition is between and including 3.5:1 and 10:1. It is clear, however, that within the scope of the present invention, the pigment to binder ratio of the first and second composition may be equal or substantially equal.

Regarding the second mentioned property, it is of course not excluded that for both layers the same dry weight would be applied. In such case, however, preferably a different pigment to binder ratio is applied in the first and second composition. Preferably for each of said both layers a dry weight of between 0.5 and 5 grams per square meter of material is applied to the paper layer, and even better between 0.8 and 4.5 grams per square meter. In the cases where the dry weight of material applied for said first layer and said second layer is different, preferably the first layer includes the highest dry weight of material, e.g. at least 20% more than the second layer. The composition of each layer preferably comprises between 12 and 20% by weight of solid matter, such that, in terms of wet weight of the layers, preferably between 4 and 23 grams per square meter of wet coating material is applied to the paper layer.

Regarding the third mentioned property, the larger pigment particles are preferably contained in said first composition. The use of large particles in the first layer provides for an excellent absorption of the inks vehicle, while the use of small particles in the second layer provides for a levelling out effect and a good reduction of dust release at the surface of the paper layer. Preferably, in such case, the pigment particles in said first composition have an average particle size between 1 and 20 micrometer. Preferably the pigment particles in said second composition have an average particle size between 100 nanometer and 1 micrometer. It is in general, of course, not excluded that the first and second composition would comprise pigment particles with a similar or same average particle size.

Regarding the fourth mentioned property, preferably said second layer comprises a higher amount of said ink reactive compound than said first layer. The availability of the ink reactive compound at the upper layer of the coating leads to an effective interaction with the pigments of the jetted ink drops. The ink reactive compound preferably comprises a flocculating agent or another ink destabilizing agent, such as a cationic metal salt.

Preferably, the binder in the first and the second composition is the same, or, at least the main constituent of the binder is the same. As stated before, the main constituent is preferably polyvinyl alcohol.

Preferably, a paper obtained with the method of the invention is provided with thermosetting resin, such as melamine resin, preferably after providing it with a printed pattern by means of inkjet printing. For this reason, preferably the paper layer is only provided with a coating at one side thereof, namely at the side provided to be printed upon. The other, opposite side, is preferably untreated, such that this opposite side shows the original porosity of the paper layer from which it is started. The resin may then be provided substantially from the bottom side into the papers core. To allow sufficient impregnation of the paper having the inkjet receiving coating, the speed of the impregnation channel may be tuned down, the resin may be made less viscous, the impregnation may be pressurized and/or the resin may be heated, e.g. to between 45 and 100° C., preferably between 45 and 70° C.

In accordance with a variant, a paper obtained with the method of the invention is provided with a waterbased polyurethane dispersion resin, an acrylic dispersion resin and/or a latex dispersion resin, or with a mixture of two or more of these resins, or with a mixture of one or more of these resins together with an aminoplastic resin, such as a melamine resin. Preferably, the resin is provided to the paper after providing it with a printed pattern by means of inkjet printing. In the case of a polyurethane or acrylic dispersion resin, the inventor found out that preferably a non-ionic or cationic dispersion is used. These dispersions are found to be better compatible with the treated paper, and the risk of flocculation after contact with the paper is reduced. This is especially the case where a metal salt, such as $CaCl_2$ is comprised in the ink receiving layer. From the above it is clear that the present invention in accordance with a particular independent aspect concerns the use of a cationic or non-ionic dispersion, preferably of polyurethane, latex or acrylate for coating and/or impregnating a printable layer or a printable substrate or a decorative paper layer, whether or not in accordance with any of the aspects relating to printable layers, decorative layers or methods for manufacturing the same, described herein. Preferably such dispersion is used to treat a paper layer comprising an inkjet receiving coating, preferably of the type at least comprising a metal salt, e.g. $CaCl_2$ or MgCl, and/or having a pH lower than 5.

Preferably, said inkjet receiving coating is a liquid substance which is deposited on said paper layer, and which is preferably forcibly dried e.g. in a hot air oven or by means of infrared or near infrared light or by means of microwave drying.

The deposition of the liquid substance for the coating or ink receiving coating may be performed in an impregnation channel or, alternatively, on the printing equipment, immediately before the printing operation. This last case solves any possible issues with limited shelf life of the inkjet receiver coating. Preferably the deposition of the liquid substance is performed while the base paper layer is still in an "endless" shape, namely taken from the roll without cutting. Such techniques allow for a more uniform application of the inkjet receiver coating. In the case the coating is wholly or partially done on the printing equipment, the printing equipment is preferably a roll-to-roll or a roll-to-sheet printer, comprising a coating device upstream of the print heads, for example a roller coater and/or additional printing heads suitable for printing the liquid substance for the respective sublayer of the inkjet receiver coating. Such additional printing heads, for example an additional row of printing heads, may have nozzles with a larger diameter than those used for the actual printing of the pattern. A resolution of 1 to 100, or even 1 to 25 dots per inch may suffice for these nozzles. The larger diameter allows for the jetting of more viscous substances. Such resolution may be sufficient for use in an embodiment in accordance with the mentioned third independent aspect of the invention wherein the step of applying the coating substance is defined and/or controlled at least in part by means of the printed pattern to be obtained.

Said liquid substance for said inkjet receiver coating preferably shows a viscosity of 10 to 75 seconds Din cup 4 at 20° C. Such property allows for a straightforward application of the liquid substance to the surface of the paper layer or foil. In experiments, a solid content of 10 to 30%, e.g. about 12%, and viscosity of 20-30 seconds, e.g. about 24 seconds yielded a sufficiently uniform coating on a previously untreated paper layer, e.g. when applied by means of a roller coater.

The invention further, in accordance with its sixth independent aspect, relates to a method for manufacturing a laminate panel, wherein said panel at least comprises a substrate material and a provided thereon top layer with a printed decor, wherein said top layer is substantially formed from thermosetting resin, polyurethane, acrylic or latex dispersion resin, and one or more paper layers, wherein said paper layers comprise a decorative paper layer and/or a printed upon printable paper layer in accordance with any of the other aspects of the invention.

Clearly, the decorative paper layer may be used in a method for manufacturing panels having a decorative surface, wherein said panels at least comprise a substrate and a top layer comprising thermosetting resin, wherein said top layer comprises a paper layer having a printed pattern, with as a characteristic that for providing said portion of said printed pattern use is made of pigment containing inks deposited on said base paper layer or printable paper layer by means of a digital inkjet printer, and in that the dry weight, and preferably also the wet weight, of the total volume of said pigment containing inks deposited on said paper layer is 9 grams per square meter or lower, preferably 3 to 4 grams per square meter or lower, wherein for said pigment containing ink use is made of a water based or so-called aqueous ink. The limitation of the dry weight of the applied ink leads to a layer of ink that lowers the risk of pressing defects and splitting in the top layer. Indeed, possible interference between the ink layer and the thermosetting resin during the pressing operation is limited. Because the ink load is limited to a maximum of 9 grams per square meter, wrinkling or expansion of the paper due to the ink can be brought to an acceptable level, which assures stable further processing. Preferably for said pigment containing ink use is made of organic pigments. Organic pigments are known to be more stable when exposed to sunlight, or other sources of UV radiation. Preferably said pigments of said pigment containing ink have an average particle size of less than 250 nanometer. Preferably said dry weight of deposited pigmented ink is 5 grams per square meter or less, for example 4 or 3 grams per square meter or less. Preferably the printed pattern is entirely, or at least essentially, made up of such pigmented ink, wherein the printed pattern covers the majority, and preferably 80 percent or more of the surface of said paper layer. Preferably said total volume of deposited pigment containing ink is less than 15 milliliter, or even better less than 10 milliliter or still less, e.g. 5 milliliter or less.

Preferably, the base paper layer of the invention is opaque and/or contains titanium oxide as a whitening agent.

Preferably the printed pattern applied to the printable paper layer of the invention, and/or comprised in the decorative paper layer of the invention, covers the majority, and preferably 80 percent or more of the surface of said paper layer Preferably said base paper layer is, before or after printing, and before or after application of the inkjet receiver coating, provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Preferably the base paper layer is, before or after printing, and before or after application of the inkjet receiver coating, provided with such an amount of thermosetting resin, that at least the paper core is satisfied with the resin. Such satisfaction can be reached when an amount of wet resin is provided that corresponds to at least 1.5 or at least 2 times the paper weight. For example, a paper having a surface weight of 70 grams per square meter, may be treated with 140 grams per square meter wet resin, i.e. 2 times the paper weight, to yield, when dried a treated paper of 140 grams per square meter having a satisfied core. It should be clear that the resin which is provided on the paper layer, is not necessarily only available in the core of the paper, but may form surface layers on both flat sides of the paper. The inkjet receiver coating may then be present on the surface of the paper with the intermediary of such a surface layer of thermosetting resin. According to a special embodiment, the paper layer is firstly impregnated through or satisfied, and, afterwards, at least at the side thereof to be printed, resin is partially removed and possibly said coating or inkjet receiver coating is provided.

Preferably, the obtained resin provided paper layer, i.e. after provision of the thermosetting resin, has a relative humidity lower than 15%, and still better of 10% by weight or lower.

In general, the paper and inkjet receiver coating, whether provided with resin or not, has a relative humidity lower than 15%, and still better of 10% by weight or lower while printing.

Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer.

Preferably said thermosetting resin is a melamine based resin, more particularly a melamine formaldehyde resin with a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapor bubbles to the surface, however the present invention provides measures for limiting such hindrance. The inkjet receiver coating is beneficial in this regard as it may provide for an additional buffer for capturing such escaping vapor. When making use of an inkjet receiver coating which is porous and/or hydrophilic, which is the case when using e.g. silica and/or polyvinyl alcohol, some of the water vapor originating upon curing the thermosetting resin of the paper layer in the press may be taken up by this coating, such that the process is less prone to the origination of pressing defects, such as locked in water vapor bubbles. Other examples of such thermosetting resins leading to a similar polycondensation reaction include ureum-formaldehyde based resins and phenol-formaldehyde based resins.

Preferably the paper layer is only impregnated with resin after application of the inkjet receiver coating and after printing. In this way the inkjet receiver coating is not at all effected by the water contained in the water-resin mixture applied for impregnation purposes.

As is clear from the above, the method of the sixth aspect of the invention preferably comprises the step of hot pressing the printed and resin provided paper layer, at least to cure the resin of the obtained resin provided decor paper. Preferably the method of the invention forms part of a DPL process as above described, wherein the printed resin provided paper layer of the invention is taken up in the stack to be pressed as the decorative layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

Clearly, in general, and/or in accordance with the sixth aspect of the invention any type of substrate material may be practiced, such as the aforementioned particle board, MDF, HDF board, or a board comprising thermoplastic material, or a mineral board. Said board comprising thermoplastic material may be a closed-cell foamed PVC board possibly comprising fillers or a solid, i.e. non-foamed, PVC board possibly comprising fillers, wherein the filler content may or may not be higher than 50 weight percent of the core material. Such filler may be a mineral filler, such as chalk or lime, or an organic filler such as wood, bamboo, grass and the like. Said mineral board may be a hydraulically setting board or a pressed board. Said mineral board may be a gypsum based board, a fiber cementboard or another cement based board such as a board based on magnesiumoxide, for example set by reaction with magnesiumchloride and/or magnesiumsulphate.

Preferably a further resin layer is applied above the printed pattern after printing, e.g. by way of an overlay, i.e. a resin provided carrier layer, or a liquid coating, preferably while the decor layer is laying on the substrate, either loosely or already connected or adhered thereto.

The base paper layer of the invention may be a colored, pigmented and/or dyed base paper. The use of a colored and/or dyed base layer enables further limiting the dry weight of deposited ink for attaining a particular pattern or color. In the case of paper, preferably the dye or pigment is added to the pulp before the paper sheet is formed. According to an alternative the ink receiving coating on said base paper layer to be printed is colored or pigmented with colored pigments. In accordance with the general disclosure, however, the pigments contained in the inkjet receiver coating are preferably colorless or white.

Preferably for printing the paper layer or foil of the invention, a digital inkjet printer is applied that allows to jet ink droplets with a volume of less than 50 picoliters. The inventors have found that working with droplets having a volume of 15 picoliters or less, for example of 10 picoliters, brings considerable advantages regarding the limitation of dry weight of deposited inks. Preferably a digital inkjet printer is applied that allows to attain a definition of at least 200 dpi, or even better at least 300 dpi (dots per inch). Preferably said digital inkjet printer is of the single pass type, wherein the paper layer is provided with said printed pattern in a single continuous relative movement of the paper layer with respect to the printer or print heads. It is not excluded that other digital inkjet printers are used to put the invention into practice, such as so called multi-pass or plotter type printers. With printers of the single pass type, as well as, at least in some cases, with printers of the multi pass type the print heads preferably extend over the entire width of the paper to be printed. This is not the case with a plotter or some multi-pass arrangements, wherein the print heads need to perform a scanning motion in the width direction of the paper layer. Such printers are however not excluded from being applied in the method of the invention. It is noted that printers of the multi-pass type have the advantage that any failing nozzle can be hidden by the print of a subsequent pass. In this type of printers the nozzles can be shifted somewhat in between passes, such that on a particular location of the paper dots are printed by several nozzles. With a multi-pass equipment, or even with a plotter it is possible to perform automatic maintenance or cleaning in between subsequent passes, when needed. The issue with failing nozzles is especially relevant when water based or so-called aqueous pigment containing inks are being used. Indeed, nozzles can get clogged by the ink pigment because the water has dried up. The fourth aspect of the invention however seeks to provide a solution for this issue, or to at least alleviate these issues.

It is clear that, according to the most preferred embodiment of the present invention, the paper layer, while printing, is still flexible and that the paper layer is only attached or put on the plate shaped substrate after printing. According to a variant the paper layer is already attached or loosely laid on the plate shaped substrate while printing. The possible attachment with the substrate can be reached by means of urea based, phenol based, melamine based, polyurethane based glues and similar adhesives. Such attachment can be attained by means of a pressing treatment, whether or not a heated press treatment.

Preferably, the method of the sixth aspect of the invention further comprises the step of applying a counter layer or balancing layer at the surface of the substrate opposite the printed paper layer. The case of a paper based decor layer, the counter layer or balancing layer preferably comprises a paper layer and thermosetting resin, preferably the same resin as the top layer.

Preferably the mutual adherence of the plate-shaped substrate, the possible counter layer and the possible transparent or translucent layer is obtained in one and the same press treatment. According to the most preferred embodiment of the sixth aspect, these steps are taken up in a DPL process.

According to the most important example of the invention, a standard printing paper, like the one used for rotogravure, having a weight between 60 and 90 grams per square meter is provided with an inkjet receiver coating in accordance with the second aspect of the invention, and is printed with a wood pattern using a digital inkjet printer with aqueous pigmented inks. Subsequently the printed paper layer is provided with melamine resin by means of a standard impregnation channel; namely by means of roller, immersion, jetting and/or spraying equipment. The resin provided paper layer is then dried until a residual humidity of less than 10%, preferably about 7%, is reached. A stack is formed of a resin provided counter layer, a plate shaped substrate, the printed resin provided paper layer and a resin provided paper layer forming a so-called overlay. The stack is then pressed during less than 30 seconds at a temperature of about 180-210° C. and a pressure of more than 20 bar, for example 38 bar. While pressing the surface of the stack contacts a structured press element, such as a structured press plate, and a relief is formed in the top layer of the obtained laminate panel. Possibly the obtained relief can be formed in register with the printed pattern of the resin provided paper layer.

It is further clear that the decorative paper layer of the first aspect, or obtained in the second and/or third aspect of the invention is suitable for use as a decor paper, respectively decor foil, in a method for manufacturing floor panels, furniture panels, ceiling panels and/or wall panels.

It is clear that the printable paper layers and/or the decorative paper layers mentioned above may have to be divided during the methods of the invention for obtaining their respective final dimensions. The panels obtained by means of a DPL press treatment or similar are preferably sawn or otherwise divided. Other treatments of the obtained panels are of course not excluded.

It is further clear that the further application of the paper layers, once printed and, obtained or obtainable through one or several of the mentioned aspects or preferred embodiments thereof, is preferably through a DPL press treatment. However, several alternative applications may be practiced as well. For example, such paper layer, preferably after having been printed, may be glued to a substrate, and finished by means of an acidly curing, a UV curing or an electron beam curing transparent lacquer.

The present invention is in no way limited to the above described embodiments, but such methods, decorative paper layers or printable substrates may be realized according to several variants without leaving the scope of the invention.

The invention claimed is:

1. A decorative paper layer comprising:

a base paper layer with a core;

an ink receiving layer provided on the base paper layer; and a pattern formed by digitally applying inks to a surface of the ink receiving layer;

wherein the inks penetrate from the surface into the core of the base paper layer over a depth that is less than 30% of a thickness of the base paper layer;

wherein the decorative paper layer, having the ink receiving layer, has a mean air resistance expressed as a Gurley value of 30-80 seconds;

wherein the ink receiving layer includes a binder and a metal salt being Calcium Chloride ($CaCl_2$);

wherein the thickness of the base paper layer is between 50 and 200 μm;

wherein the ink receiving layer includes a first layer having a first composition and an upper second layer having a second composition;

wherein both the first and the second compositions include a binder;

wherein the second composition is free from pigment;

wherein the metal salt is present in the second composition;

wherein the second layer is an uppermost layer of the decorative paper layer.

2. The decorative paper layer of claim 1, wherein the depth is less than 30 μm.

3. The decorative paper layer of claim 1, wherein silica particles are available on a surface of the base paper layer.

4. The decorative paper layer of claim 3, wherein the silica particles are particles of precipitated silica.

5. The decorative paper layer according to claim 1, wherein the inks are applied by firing ink droplets to the base paper layer at a definition as expressed by a DPI value (Dots Per Inch) and yielding an average distance in between centers of each dot formed by each ink droplet, and that the dots formed by the ink droplets are larger than the average distance.

* * * * *